United States Patent [19]

Damen et al.

[11] Patent Number: 4,550,249
[45] Date of Patent: Oct. 29, 1985

[54] OPTICAL DISC READ/WRITE APPARATUS

[75] Inventors: Theodoor C. Damen, Colts Neck; Michael A. Duguay, Fair Haven; Richard E. Howard; Lawrence D. Jackel, both of Holmdel; William J. Skocpol, East Windsor, all of N.J.

[73] Assignee: AT&T Bell Laboratories, Murray Hill, N.J.

[21] Appl. No.: 487,248

[22] Filed: Apr. 21, 1983

[51] Int. Cl.$^4$ ............................................. G01J 1/20
[52] U.S. Cl. ................................. 250/201; 250/578; 369/44
[58] Field of Search ............... 250/201 DF, 578, 570; 369/44, 45, 46, 112; 235/470; 358/347; 364/822

[56] References Cited

U.S. PATENT DOCUMENTS 3,924,063  12/1975  Simons ................................. 369/44
4,346,292  8/1982  Routt et al. ......................... 250/216

OTHER PUBLICATIONS

High Performance Optical Reader for Video Disc Substrates, Lurie et al, RCA Review, vol. 43, pp. 128–166, 3/82.

Primary Examiner—David C. Nelms
Assistant Examiner—J. Gatto
Attorney, Agent, or Firm—Lester H. Birnbaum

[57] ABSTRACT

A read/write system which reduces access time in optical disc apparatus is disclosed. The head includes an array of lenses which covers a substantial portion of the radius of the disc. Access of a particular disc track is achieved by deflection of the reading beam, rather than by any physical movement of the head. For read-out, the array focuses light reflected from the disc onto a corresponding array of photodetectors.

10 Claims, 6 Drawing Figures

OPTICAL DISC READ/WRITE APPARATUS

BACKGROUND OF THE INVENTION

The invention relates to optical disc apparatus, and in particular, to a system for writing or reading out information stored in optical disc medium.

Optical disc technology is currently gaining increasing importance in the field of information storage. This increasing interest is primarily due to the fact that optical discs are capable of far greater storage capacity than standard magnetic discs now used for computer memory, while the reading apparatus and recording medium are typically much less expensive.

Usually, the optical disc includes one or more layers of suitable materials (such as Te-Se) in which pits are formed. The length of a pit, as well as the presence or absence of a pit, can represent the stored information. The pits are formed in several tracks along the disc in a manner similar to a phonograph record. In order to read-out the information, a laser beam is focused into the desired track by optical components included in a head which is moved in a radial direction while the disc is rotated. The light which is reflected by the disc medium is directed to one or more photodetectors which give an electrical signal indicative of the presence or absence of pits along the track (as well as their shape) and so the recorded information may be reproduced.

One of the disadvantages of optical disc over magnetic disc technology at the present time is the slower access time capability in the former. The usefulness of optical discs in future systems will increase if faster access times are available.

Consequently, it is a primary object of the invention to reduce access times in optical disc apparatus.

SUMMARY OF THE INVENTION

This and other objects are achieved in accordance with the invention, which is an optical disc apparatus including means for accessing information stored in the recording medium. The apparatus includes an array comprising a plurality of lenses extending over at least a substantial portion of the width of the recording medium and each lens adapted to focus light onto at least one track on the recording medium. Also included are means for directing a light beam onto a desired track comprising at least one mirror which is mechanically manipulated to deflect the light beam onto a desired lens of the array.

BRIEF DESCRIPTION OF THE DRAWING

These and other features of the invention are delineated in detail in the following description. In the drawing.

It will be appreciated that for purposes of illustration, these figures are not necessarily drawn to scale.

DETAILED DESCRIPTION

The invention will now be described with reference to the embodiment illustrated schematically in the various views of FIGS. 1-3. For the sake of simplicity, elements not necessary for the understanding of the basic principles of the invention have been omitted.

Figure 1:
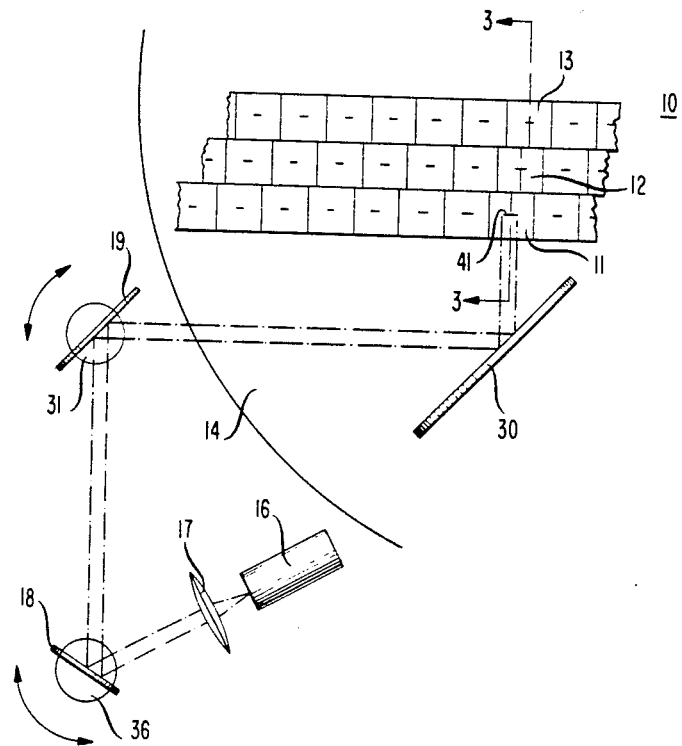
FIG. 1 is a top schematic view of read-out apparatus in accordance with one embodiment of the invention.

FIG. 1 is a top view showing a portion of an optical disc, 14, in which information may be written or read out in accordance with the invention. In this example, it is assumed that information is read out.

The apparatus includes an array, 10, of convex lenses such as 11, 12, and 13, formed in a plurality of rows. For the purpose of discussion, only a portion of the array is shown. In actual practice, it is contemplated that the length of the array will cover essentially that portion of the disc radius over which optical information is recorded. This would be typically 4 inches for a 6 inch radius disc. The number of rows in the array is probably not critical, but approximately 10 rows would apparently be sufficient for good resolution. Typically, each lens is about 2 mm in diameter and is made from glass. For purposes of illustration, the array is greatly enlarged.

Figure 2:
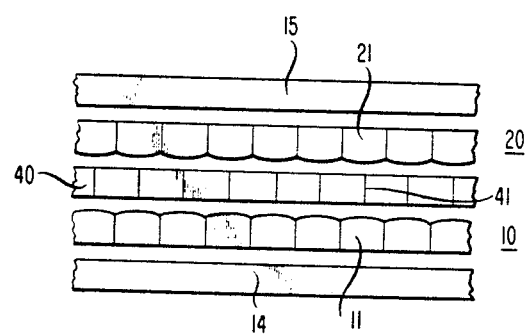
FIG. 2 is a frontal schematic view of a portion of the apparatus in accordance with the same embodiment.

Associated with each lens is a mirror, illustrated as dashes such as 41, and more readily understood from the front view of FIG. 2. In this particular example, each set of mirrors in a row is formed from a glass slide, such as 40, with reflective coatings formed at the desired portions above each lens. Each mirror in this example would typically be approximately 200 $\mu$m wide. A typical coating would be aluminum with a thickness of 500 Angstroms. As shown in the view of FIG. 3, which is a cross-sectional view along line 3—3 of FIG. 1, each mirror is tilted approximately 45 degrees in order to direct light from reading beam, 50, onto its associated lens. Alternatively, each row of mirrors could be formed by a uniform reflective coating all along the slide, 40, where the coating reflects only a part of the beam, 50, (e.g., 10 percent) so that at least a portion of the beam can be transmitted to each row. An antireflection coating could also be employed on the back side of each slide.

Figure 3:
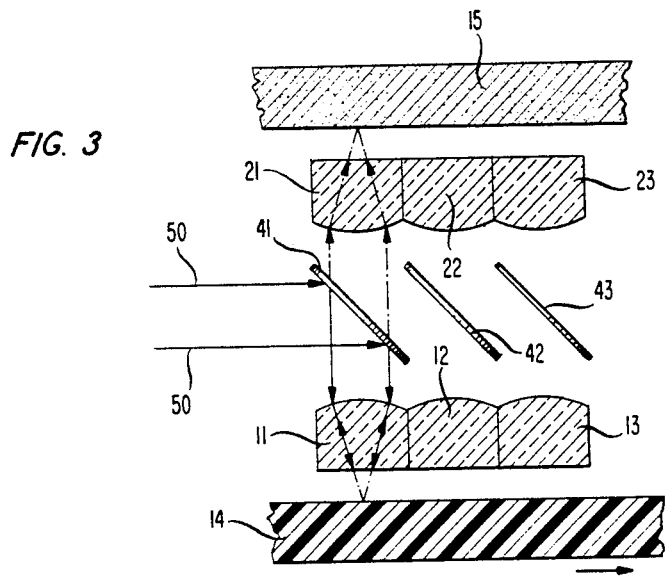
FIG. 3 is a cross-sectional view of a portion of the apparatus along line 3—3 of FIG. 1 in accordance with the same embodiment.

As also illustrated in FIGS. 2 and 3, above the first array, 10, is an essentially identical second array, 20, of lenses such as 21, 22, and 23. Each of the lenses of the second array is placed with respect to a lens of the first array so that light reflected from the disc area under a lens of the first array will be focused by a corresponding lens of the second array onto an array of standard photodetectors, illustrated simply as plate, 15. In this example, lenses 21, 22, and 23 correspond, respectively, to lenses 11, 12, and 13.

FIG. 3 illustrates by a ray diagram how a read-out beam is deflected by a mirror, 41, onto lens, 11, to be focused onto disc, 14, and the reflected light (shown by dashed lines) is collimated by lens, 11, and focused by lens 21 onto the photodetectors in array, 15. (The reflected light passes through the portion of slide, 40 which is uncoated.) The photodetector array can comprise p-i-n diodes, charge coupled devices, or any standard photodetector components. The lens arrays, 10 and 20, the slides, 40, and the photodetector array, 15, can all be positioned in the read/write head by standard fixtures (not shown). The arrow beneath disc 14 shows the usual direction of motion of the disc during read-out.

The means for directing a read-out beam to the array 5 is also illustrated schematically in FIG. 1. The beam is provided by a standard light source, such as laser, 16, with the beam being collimated by lens, 17. A series of mirrors, 18, 19, and 30 deflect the beam toward the array. Mirror 30 is stationary and is large enough to deflect the beam onto any portion of the array (although it is shown as much smaller than the array for purposes of illustration). Mirrors 18 and 19 are each rotatably mounted on some means such as galvanometers, 36 and 31, respectively, so that they can be rotated in directions generally indicated by the arrows in order to direct the beam onto various portions of mirror, 30. This, in turn, will cause incidence of the beam onto the desired portion of lens array, 10. Mirror, 19, is typically larger than mirror, 18.

Thus, rather than move the read/write head to a desired area above the disc, the present invention contemplates a head which remains essentially stationary and a desired area of the disc is accessed by movement of one or more deflecting mirrors (18, 19). This should considerably reduce access time since the mirror can be moved much faster than the head. Whereas present track access times are greater than approximately 100 ms, it is expected that track access times of less than 10 ms could be achieved with the present invention. (Track access time is the time it takes to move the head from one end of the active area of the disc to the other end.) It will be appreciated that, although three deflecting mirrors are shown in this example, for purposes of achieving horizontal and vertical beams, the only component which is necessary in all cases is a single, rotatably mounted mirror such as 18.

In the particular example shown here, the horizontal width of the read-out beam is approximately 200 μm to correspond to the width of a mirror portion such as 41 and the vertical dimension of the beam is 2 mm to match the lens diameter. Each mirror and lens combination (such as 41 and 11) is designed to deflect and focus the beam onto ten tracks of the disc. It will be noted that the rows of lenses in the array, 10, are staggered so that a proximate set of ten tracks in the disc is accessed by directing the beam to mirror, 42, which is focused by lens, 12, onto the disc. A further proximate set of ten tracks is accessed by the focusing of lens, 13, after deflection from mirror, 43, etc.

Figure 4:
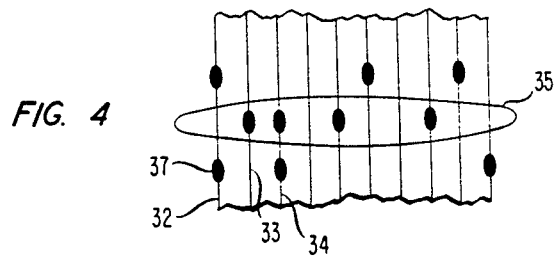
FIG. 4 is a schematic illustration of a portion of the recording medium demonstrating a feature of the same embodiment.

FIG. 4 shows a portion of a typical disc with ten tracks, such as 32, 33, and 34 where information is stored in each track shown in the form of pits in the medium, illustrated as dots, 37. The focused laser beam from lens, 11, is illustrated as 35 to indicate that the beam will cover ten tracks simultaneously. The absence of a bit in a track, such as 32, and the presence of bits in tracks, such as 33 and 34 in this illustration, will be determined by the reflection of the beam and focusing onto the photodetector array by the lens combination 11 and 21.

Figure 5:
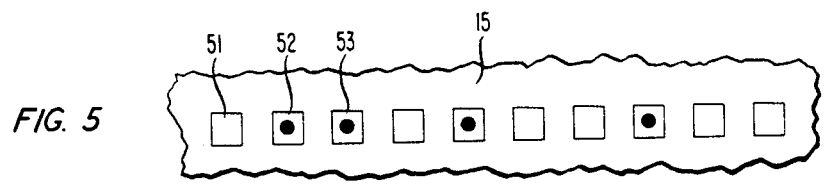
FIG. 5 is a schematic illustration of a portion of the photodetector array in accordance with the same embodiment.

FIG. 5 illustrates schematically the portion of the photodetector array which will be affected by the reflected light from the disc focused by lens combination 11 and 21. Each photodetector is shown schematically as a square such as 51, 52, and 53. Each track will be focused onto a different photodetector so that, for example, the absence of a pit will be detected from track, 32, as indicated by the absence of a dot in 51 and the presence of pits in tracks, 33 and 34, will be detected by 52 and 53, respectively, as indicated by the dots in those squares.

Figure 6:
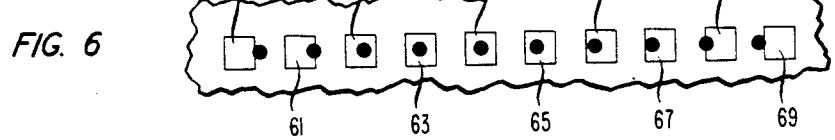
FIG. 6 is a schematic illustration of a portion of the photodetector array in accordance with a further embodiment.

As illustrated in the embodiment of FIG. 6, the photodetectors accessed by a particular lens combination can also be formed so that the spacing gradually increases as one moves away from the center of the focused beam. For example, photodetectors 60-69 are shown each receiving the presence of a bit from a particular track in the disc. Photodetectors 62-67 receive virtually the entire signal from their associated tracks, while detectors 60, 61, 68 and 69 receive only part of the light due to the spacing of these detectors. Those latter four detectors can be used for tracking. Thus, for example, if the head drifts a little to the left or right in FIG. 1, the signals from the two photodetectors at one end of the photodetector row in FIG. 6 will increase while the signal intensity from the two detectors at the opposite end will decrease. This change in signal intensity provides information to the tracking computer to apply the proper corrective motion to the head.

It will also be noted that it is preferable to provide some magnification of the reflected light from the disc to ease micro-electronic fabrication requirements for the photodetector array. In this example, a magnification of ten can be achieved by choosing the focal length of the lenses in array, 20, to be ten times that of the lenses in array, 10. In such an embodiment, each detector can be approximately 8 μm × 8 μm and approximately 10 μm apart for the example in FIG. 5. In the example of FIG. 6, the separation of the middle detectors can also be 10 μm, with the separation gradually increasing to approximately 13 μm for the end detectors.

One important consideration in the design of the lens arrays and mirror combination is to choose a mirror size and beam cross-section which causes the beam to cover essentially the entire diameter of a lens in a direction tangential to the tracks (as shown in FIG. 3), while covering only a small portion of the diameter of the lens in the radial direction (as shown in FIG. 1). This will cause the focused beam waist (as illustrated in FIG. 4) to be wide in the radial direction and therefore cover several tracks, while narrow in the tangential direction to prevent overlapping of adjacent bits on a single track. This can be accomplished, for example, with a beam cross-section of 200 μm × 2 mm and a mirror having a width of 200 μm and a length of 3 mm. Such a beam will cover approximately 10 percent of the lens diameter in the radial direction. For a 0.7μ light source, this will allow ten tracks to be illuminated at once if the tracks and information pits are 1 μm apart.

It will be appreciated that the head in accordance with the invention need not be absolutely stationary during read-out. For example, if the focused spot size is small, some motion may be desirable to cover the full field. That is, if a set of tracks to be accessed overlaps two different mirror and lens combinations, it may be desirable to move the head slightly to position the tracks directly below a particular mirror and lens combination. In such cases, in this example, a movement of only ±100 μm is needed for addressing. In addition, tracking of eccentric tracks and dynamic focusing may make periodic motion of the head in the radial and vertical direction desirable. In such cases, the head is moved only approximately ±20 μm in the radial direction and ±10 μm in the vertical direction. To accomplish this motion, the array can be mounted on standard piezo-electric mounts.

It may also be desirable in certain cases to fabricate a lens array which covers less than the full radius of the disc. For example, a plurality of heads could be provided, each covering a corresponding fraction of the radius of the disc. It is anticipated that in order to obtain maximum benefit of the present invention, the lens array should cover at least one-quarter of the disc radius.

If it is desired to write information into the disc, the array shown in FIGS. 1-3 could be modified by providing a single row of lenses in the first array, 10, and a single reflective surface, 41, over this row so that light would be deflected to fill the full diameter of a desired lens in the array for obtaining a sufficiently small spot size.

Various additional modifications of the invention will become apparent to those skilled in the art. All such variations which basically rely on the teachings through which the invention has advanced the art are properly considered within the spirit and scope of the invention.

What is claimed is:

1. Optical disc apparatus including means for accessing information stored in a recording medium comprising:
    a first array comprising at least one row of lenses extending over at least a substantial portion of the width of the recording medium, with each lens adapted to focus light onto at least one track on the recording medium, and each lens extending in a tangential and radial direction with respect to the tracks on the recording medium; and
    means for directing a light beam onto a desired track comprising at least one mirror which is mechanically manipulated to deflect the light beam onto a desired lens of the array.

2. The apparatus according to claim 1 wherein the array comprises a plurality of staggered rows of lenses.

3. The apparatus according to claim 1 wherein the mirror is rotatably mounted on a galvanometer.

4. The apparatus according to claim 1 further comprising an array of mirrors formed above each lens in the array.

5. The apparatus according to claim 1 further comprising a second array of lenses formed above the first array, each lens of the second array adapted to focus light reflected from the recording medium and passing through one of the lenses of the first array.

6. The apparatus according to claim 1 further comprising an array of photodetectors formed above the lens array and adapted to receive light reflected from the recording medium through the lens array.

7. The apparatus according to claim 4 wherein the array of mirrors is formed by glass plates formed above each row of the lens array with reflective coatings formed on portions of said plates above each lens.

8. The apparatus according to claim 1 wherein each lens in the array focuses light onto a plurality of adjacent tracks on the recording medium.

9. The apparatus according to claim 4 wherein each mirror is designed to deflect light onto a lens in the array so that the light essentially covers the full diameter of the lens in the direction tangential to the tracks and only a portion of the diameter of the lens in the radial direction.

10. Optical disc apparatus including means for reading out information stored in tracks in the disc comprising:
    a first array comprising a plurality of staggered rows of lenses extending over essentially the entire radius of the disc, with each lens adapted to focus light onto a plurality of tracks in the disc and each lens extending in a tangential and radial direction with respect to the tracks in the disc;
    a second array of mirrors positioned over the first array of lenses such that each mirror deflects light from a reading beam onto a lens so that the light essentially covers the full diameter of the lens in a direction tangential to the tracks and only a portion of the diameter of the lens in the radial direction;
    a third array of lenses positioned over the first and second arrays so that each lens in the third array focuses light reflected from the disc which passes through a lens of the first array;
    a fourth array of photodetectors formed over the third array and adapted to receive light reflected from the disc and passing through the first and third arrays so that light reflected from each track will be focused onto one of the photodetectors; and
    means for directing a light beam onto a desired portion of the disc comprising at least one mirror rotatably mounted on a galvanometer to deflect the light beam onto a desired lens of the first array.

* * * * *